(12) United States Patent
Hasegawa et al.

(10) Patent No.: US 11,955,149 B1
(45) Date of Patent: Apr. 9, 2024

(54) DISK DEVICE WITH POSITIONED RAMP

(71) Applicants: Kabushiki Kaisha Toshiba, Tokyo (JP); Toshiba Electronic Devices & Storage Corporation, Tokyo (JP)

(72) Inventors: Hisashi Hasegawa, Yokohama Kanagawa (JP); Hideki Yamaguchi, Sagamihara Kanagawa (JP); Sinji Tukada, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/179,694

(22) Filed: Mar. 7, 2023

(30) Foreign Application Priority Data

Sep. 16, 2022 (JP) .................................. 2022-147873

(51) Int. Cl.
*G11B 5/48* (2006.01)
*G11B 5/54* (2006.01)

(52) U.S. Cl.
CPC .......... *G11B 5/4826* (2013.01); *G11B 5/4846* (2013.01); *G11B 5/54* (2013.01)

(58) Field of Classification Search
CPC ........... G11B 5/54; G11B 21/22; G11B 21/12; G11B 5/4826; G11B 5/4846
See application file for complete search history.

(56) References Cited

U.S. PATENT DOCUMENTS

| 5,148,339 | A | * | 9/1992 | Yoshida | G11B 5/54 |
| 5,833,403 | A | * | 11/1998 | Barazani | B23B 27/007 |
| | | | | | 407/101 |
| 5,875,074 | A | * | 2/1999 | Ho | G11B 5/54 |
| 6,057,987 | A | * | 5/2000 | Furay | G11B 21/22 |
| 6,181,528 | B1 | | 1/2001 | Reinhart et al. | |
| 6,231,275 | B1 | * | 5/2001 | Kunimori | B23C 5/1036 |
| | | | | | 407/65 |
| 6,344,950 | B1 | * | 2/2002 | Watson | G11B 21/22 |
| 6,487,051 | B1 | * | 11/2002 | Koyanagi | G11B 5/54 |
| 6,515,959 | B1 | * | 2/2003 | Fairchild | G11B 5/54 |
| 6,927,943 | B1 | * | 8/2005 | McGrath | G11B 5/54 |
| 7,633,719 | B2 | * | 12/2009 | Duvall | G11B 25/043 |
| | | | | | 360/97.15 |
| 7,672,083 | B1 | * | 3/2010 | Yu | G11B 21/22 |
| | | | | | 360/254.9 |
| 7,697,238 | B2 | * | 4/2010 | Makoto | G11B 5/54 |
| | | | | | 360/254.3 |

(Continued)

*Primary Examiner* — Brian E Miller
(74) *Attorney, Agent, or Firm* — Kim & Stewart LLP (57) ABSTRACT

In general, according to one embodiment, a disk device includes a magnetic disk, a magnetic head, a suspension, a ramp, a housing, and a screw. The suspension holds the magnetic head and moves to an unload position. The ramp includes an attachment tab with a through hole. The ramp holds the suspension at the unload position. The housing has a support surface with a screw hole to support the attachment tab. The screw includes a screw head, a screw shaft, and a first contact surface. The screw shaft extends from the screw head in a first direction and is fitted into the screw hole through the through hole. The first contact surface is located on the screw head, tapers in the first direction, and contacts the attachment tab. The screw holds the attachment tab in-between the support surface and the first contact surface.

12 Claims, 9 Drawing Sheets

(56) References Cited

U.S. PATENT DOCUMENTS

| | | | | |
|---|---|---|---|---|
| 7,813,078 B1* | 10/2010 | Gleason | ............... | G11B 25/043 |
| | | | | 360/97.13 |
| 8,493,690 B1* | 7/2013 | Ono | ...................... | G11B 21/22 |
| | | | | 360/254.8 |
| 9,183,862 B1* | 11/2015 | Shah | ..................... | G11B 5/4806 |
| 9,196,275 B1* | 11/2015 | Davidson | ................ | G11B 21/22 |
| 9,536,552 B1* | 1/2017 | Chen | ....................... | G11B 21/22 |
| 2002/0039258 A1* | 4/2002 | Noda | ........................ | G11B 5/54 |
| 2002/0044386 A1* | 4/2002 | Koyanagi | .............. | G11B 21/22 |
| 2005/0018354 A1* | 1/2005 | Takahashi | ................ | G11B 5/54 |
| 2005/0213254 A1* | 9/2005 | Okutomi | .................. | G11B 5/54 |
| 2006/0256478 A1* | 11/2006 | Hayakawa | ............. | G11B 21/22 |
| 2008/0037176 A1* | 2/2008 | Matsuda | .................. | G11B 5/54 |
| 2008/0285175 A1* | 11/2008 | Okutomi | ................. | G11B 21/22 |
| | | | | 360/254.8 |
| 2009/0279210 A1* | 11/2009 | Rappel | .................... | G11B 5/54 |
| | | | | 360/245.4 |
| 2009/0290258 A1* | 11/2009 | Matsuda | ................. | G11B 5/54 |
| 2010/0061012 A1* | 3/2010 | Seki | ........................ | G11B 5/54 |
| | | | | 360/99.06 |
| 2010/0246053 A1* | 9/2010 | Satou | ..................... | G11B 21/22 |
| | | | | 360/75 |
| 2010/0296198 A1* | 11/2010 | Viskochil | ................ | G11B 21/22 |
| 2012/0075750 A1* | 3/2012 | Chan | ..................... | G11B 21/22 |
| | | | | 360/294 |

\* cited by examiner

DISK DEVICE WITH POSITIONED RAMP

CROSS-REFERENCE TO RELATED APPLICATIONS

This application is based upon and claims the benefit of priority from Japanese Patent Application No. 2022-147873, filed on Sep. 16, 2022, the entire contents of which are incorporated herein by reference.

FIELD

Embodiments described herein relate generally to a disk device.

BACKGROUND

Disk devices such as a hard disk drive (HDD) include, for example, magnetic disks, magnetic heads, suspensions, and a ramp. The magnetic heads are held by the corresponding suspensions. The suspensions rotate between a load position where the each magnetic head is located on the surface of the corresponding magnetic disk and an unload position where the suspensions are held by the ramp. The ramp is attached to a housing with, for example, a screw.

The screw passes through a through hole in the ramp to attach the ramp to the housing. There may be a gap, for example, between the screw shaft and the inner surface of the through hole in the ramp, which may cause displacement of the ramp from a predetermined position in a direction orthogonal to the screw shaft.

DETAILED DESCRIPTION

In general, according to one embodiment, a disk device includes a magnetic disk, a magnetic head, a suspension, a ramp, a housing, and a screw. The magnetic disk has a recording surface. The magnetic head is configured to read and write information from and to the magnetic disk. The suspension holds the magnetic head and is configured to move between a load position where the magnetic head is located on the recording surface and an unload position where the magnetic head is apart from the recording surface. The ramp includes an attachment tab with a through hole. The ramp is configured to hold the suspension at the unload position. The housing accommodates the magnetic disk, the magnetic head, the suspension, and the ramp. The housing has a support surface with a screw hole to support the attachment tab. The screw includes a screw head, a screw shaft, and a first contact surface. The screw shaft extends from the screw head in a first direction and is fitted into the screw hole through the through hole. The first contact surface is located on the screw head or in-between the screw head and the attachment tab, tapers in the first direction, and contacts the attachment tab. The screw holds the attachment tab in-between the support surface and the first contact surface.

First Embodiment

Hereinafter, a first embodiment will be described with reference to FIGS. 1 to 5. Note that, in the present specification, components according to embodiments and descriptions of the components may be described in a plurality of expressions. The components and the descriptions thereof are examples, and are not limited by the expression of the present specification. The components may also be identified with names different from those herein. In addition, the component may be described by an expression different from the expression in the present specification.

Figure 1:
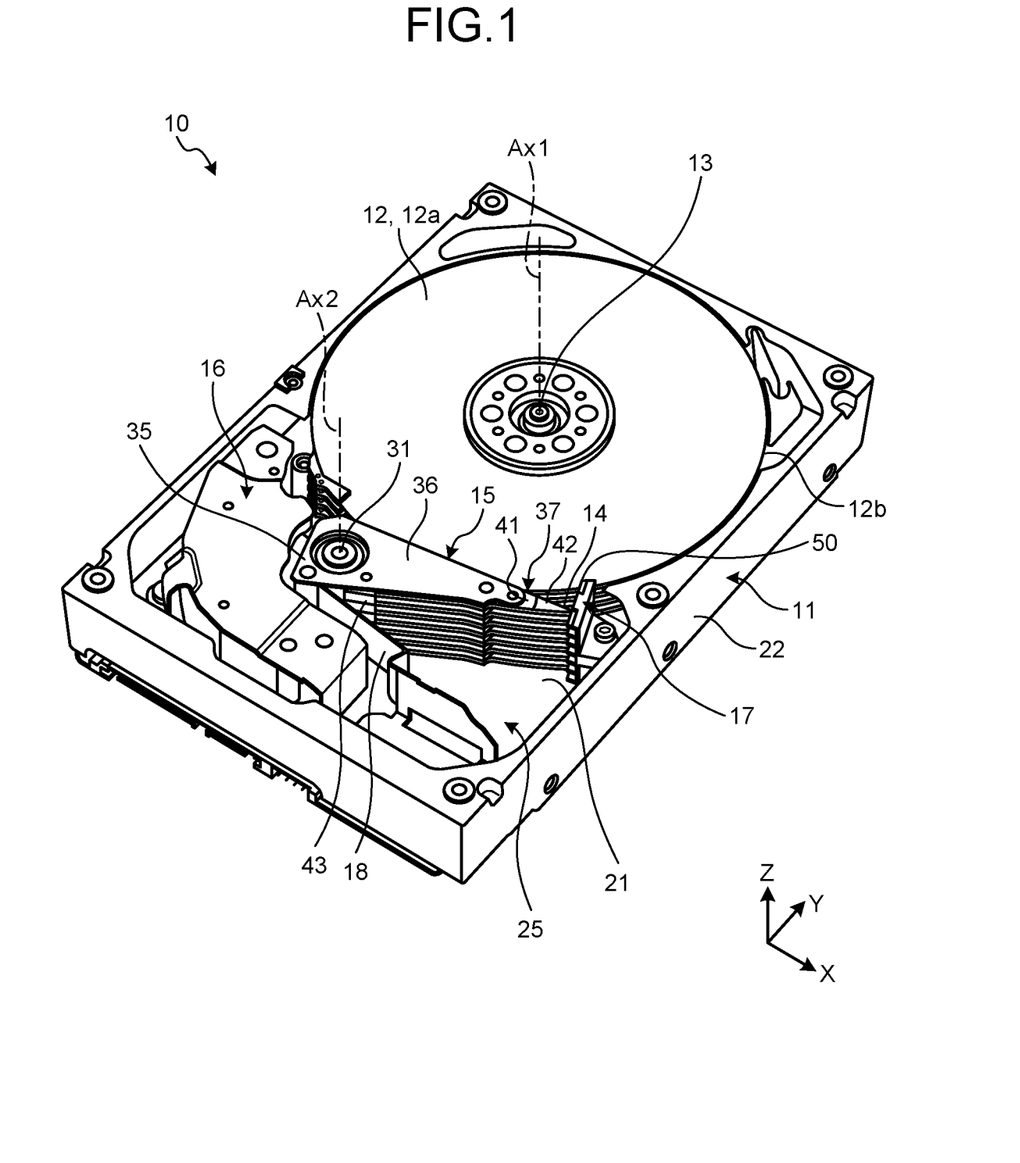
FIG. 1 is an exemplary perspective view illustrating a hard disk drive (HDD) according to a first embodiment.

FIG. 1 is an exemplary perspective view illustrating a hard disk drive (HDD) 10 according to a first embodiment. The HDD 10 is an example of a disk device, and may also be referred to as an electronic device, a storage device, an external storage device, or a magnetic disk device.

As illustrated in the drawings, in the present specification, an X axis, a Y axis, and a Z axis are defined for convenience. The X axis, the Y axis, and the Z axis are orthogonal to each other. The X axis is provided along the width of the HDD 10. The Y axis is provided along the length of the HDD 10. The Z axis is provided along the thickness of the HDD 10.

Furthermore, in the present specification, an X direction, a Y direction, and a Z direction are defined. The X direction is a direction along the X axis and includes a +X direction indicated by an arrow of the X axis and a −X direction which is an opposite direction of the arrow of the X axis. The Y direction is a direction along the Y axis and includes a +Y direction indicated by an arrow of the Y axis and a −Y direction which is an opposite direction of the arrow of the Y axis. The Z direction is a direction along the Z axis and includes a +Z direction indicated by an arrow of the Z axis and a −Z direction which is an opposite direction of the arrow of the Z axis.

As illustrated in FIG. 1, the HDD 10 includes a housing 11, a plurality of magnetic disks 12, a spindle motor 13, a plurality of magnetic heads 14, a head stack assembly (HSA) 15, a voice coil motor (VCM) 16, a ramp load mechanism 17, and a flexible printed circuit board (FPC) 18. The housing 11 may also be referred to as a base. The ramp load mechanism 17 is an example of a ramp.

The housing 11 is made of, for example, a metal material such as an aluminum alloy. The housing 11 has a rectangular parallelepiped box shape extending in the Y direction and opened in the +Z direction. The housing 11 has a bottom wall 21 and a peripheral wall 22.

The bottom wall 21 has a substantially rectangular (quadrangular) plate shape extending along the X-Y plane. The peripheral wall 22 protrudes substantially in the +Z direction from the edge of the bottom wall 21 and has a substantially rectangular frame shape. The bottom wall 21 and the peripheral wall 22 are integrally formed.

The housing 11 has an inner chamber 25 open in the +Z direction. The inner chamber 25 is formed, defined, or partitioned by the bottom wall 21 and the peripheral wall 22, for example. Thus, the peripheral wall 22 surrounds the inner chamber 25. The housing 11 accommodates the magnetic disks 12, the spindle motor 13, the magnetic heads 14, the HSA 15, the VCM 16, and the ramp load mechanism 17 in the inner chamber 25.

One or more covers are attached to the end portion of the peripheral wall 22 in the +Z direction. The cover closes the inner chamber 25, for example, in a substantially airtight manner. The inner chamber 25 is filled with a gas different from air. For example, the inner chamber 25 is filled with a low density gas having a density lower than that of air, an inert gas having low reactivity, or the like. In the present embodiment, the inner chamber 25 is filled with helium. Note that the inner chamber 25 may be filled with another fluid. Further, the inner chamber 25 may be maintained at vacuum, low pressure close to vacuum, or negative pressure lower than atmospheric pressure.

The plurality of magnetic disks 12 is spread and arranged along the X-Y plane. The diameter of the magnetic disk 12 is, for example, 3.5 inches, but is not limited to this example. Each magnetic disk 12 has, for example, at least one recording surface 12a and an outer edge 12b.

The recording surface 12a is provided on at least one of the upper surface and the lower surface of the magnetic disk 12. In other words, each of the plurality of recording surfaces 12a is a surface of the magnetic disk 12 facing substantially in the +Z direction or a surface of the magnetic disk 12 facing substantially in the -Z direction. The recording surface 12a is a substantially flat surface extending along the X-Y plane. The magnetic recording layer of the magnetic disk 12 is provided on the recording surface 12a. Note that the magnetic recording layer may not be provided on a part of the recording surface 12a. The outer edge 12b is an outer peripheral surface of the magnetic disk 12.

The spindle motor 13 is attached to the bottom wall 21 of the housing 11. Note the spindle motor 13 may be disposed at another position. The plurality of magnetic disks 12 is attached to the spindle motor 13.

The plurality of magnetic disks 12 is arranged at intervals in the Z direction. For example, a spacer is disposed between the plurality of magnetic disks 12. The spindle motor 13 has a hub that supports the plurality of magnetic disks 12. The plurality of magnetic disks 12 is held by the hub of the spindle motor 13 by, for example, a clamp spring.

The spindle motor 13 rotates the plurality of magnetic disks 12 about a first rotation axis Ax1. The first rotation axis Ax1 is a virtual axis extending substantially in the Z direction. That is, the first rotation axis Ax1 extends in a direction orthogonal (intersecting) to the recording surface 12a.

The first rotation axis Ax1 is the center of rotation by the spindle motor 13, and is also the axis of the magnetic disk 12 and the hub of the spindle motor 13. Note that the axis of the magnetic disk 12 and the axis of the hub of the spindle motor 13 may be different from the center of rotation by the spindle motor 13.

The magnetic head 14 records and reproduces information on and from the recording surface 12a of the magnetic disk 12. In other words, the magnetic head 14 reads and writes information from and to the magnetic disk 12. The magnetic head 14 is mounted on the HSA 15.

The HSA 15 is rotatably supported by a support shaft 31 disposed at a position separated from the magnetic disk 12. The support shaft 31 extends, for example, substantially in the +Z direction from the bottom wall 21 of the housing 11.

The HSA 15 can rotate about a second rotation axis Ax2 spaced apart from the first rotation axis Ax1. The second rotation axis Ax2 is a virtual axis extending substantially in the Z direction. Therefore, the first rotation axis Ax1 and the second rotation axis Ax2 are arranged substantially in parallel. The second rotation axis Ax2 is, for example, the center of rotation of the HSA 15 and is also the axis of the support shaft 31.

The VCM 16 rotates the HSA 15 about the second rotation axis Ax2 to a desired position. When the magnetic head 14 moves to the outermost periphery of the magnetic disk 12 by the rotation of the HSA 15 by the VCM 16, the ramp load mechanism 17 holds the magnetic head 14 away from the magnetic disk 12.

The HSA 15 includes an actuator block 35, a plurality of arms 36, and a plurality of head suspension assemblies (suspensions) 37. The suspension 37 may also be referred to as a head gimbal assembly (HGA).

The actuator block 35 is rotatably supported by the support shaft 31 via a bearing, for example. The plurality of arms 36 protrude from the actuator block 35 in a direction orthogonal to the second rotation axis Ax2. Note that the HSA 15 may be divided, and the arm 36 may protrude from each of the plurality of actuator blocks 35.

The plurality of arms 36 is disposed at intervals in the Z direction. Each of the arms 36 has a plate shape to enter a gap between the adjacent magnetic disks 12. The plurality of arms 36 extend substantially in parallel.

The actuator block 35 and the plurality of arms 36 are integrally formed of, for example, aluminum. Note that the materials of the actuator block 35 and the arm 36 are not limited to this example.

A voice coil of the VCM 16 is provided on a protrusion protruding from the actuator block 35 to the opposite side of the arm 36. The VCM 16 includes a pair of yokes, a voice coil disposed between the yokes, and a magnet provided on the yoke.

Each of the suspensions 37 is attached to the tip end of the corresponding one of the arms 36 and protrudes from the arm 36. Accordingly, the suspensions 37 are disposed at intervals in the Z direction. Each of the suspensions 37 includes a base plate 41, a load beam 42, and a flexure 43.

The base plate 41 and the load beam 42 are made of, for example, stainless steel. Note that the materials of the base plate 41 and the load beam 42 are not limited to this example. The base plate 41 is attached to the distal end of the arm 36.

The load beam 42 is attached to the distal end of the base plate 41 and protrudes from the base plate 41 in a direction orthogonal to the second rotation axis Ax2. The load beam 42 is thinner than the base plate 41 and has a plate shape extending along the X-Y plane.

The flexure 43 has an elongated belt shape. Note that the shape of the flexure 43 is not limited to this example. The flexure 43 is, for example, a multi-layer plate including a metal plate (backing layer) made of stainless steel or the like, an insulating layer formed on the metal plate, a conductive layer formed on the insulating layer and constituting a plurality of sets of wiring (wiring patterns), and a protective layer (insulating layer) covering the conductive layer.

The flexure 43 is attached to the base plate 41 and the load beam 42. The flexure 43 has a displaceable gimbal (elastic support) at one end above the load beam 42. The magnetic head 14 is mounted on the gimbal. In other words, the suspension 37 holds the magnetic head 14. The flexure 43 is electrically connected to the magnetic head 14.

One end of the FPC 18 is connected to the flexure 43. The other end of the FPC 18 is connected to a substrate disposed outside the housing 11 via a connector provided in the housing 11, for example. For example, a controller that controls the entire HDD 10 and an interface connector connected to a host computer are mounted on the substrate. The substrate is electrically connected to the magnetic head 14 via the FPC 18 and the flexure 43.

Figure 2:
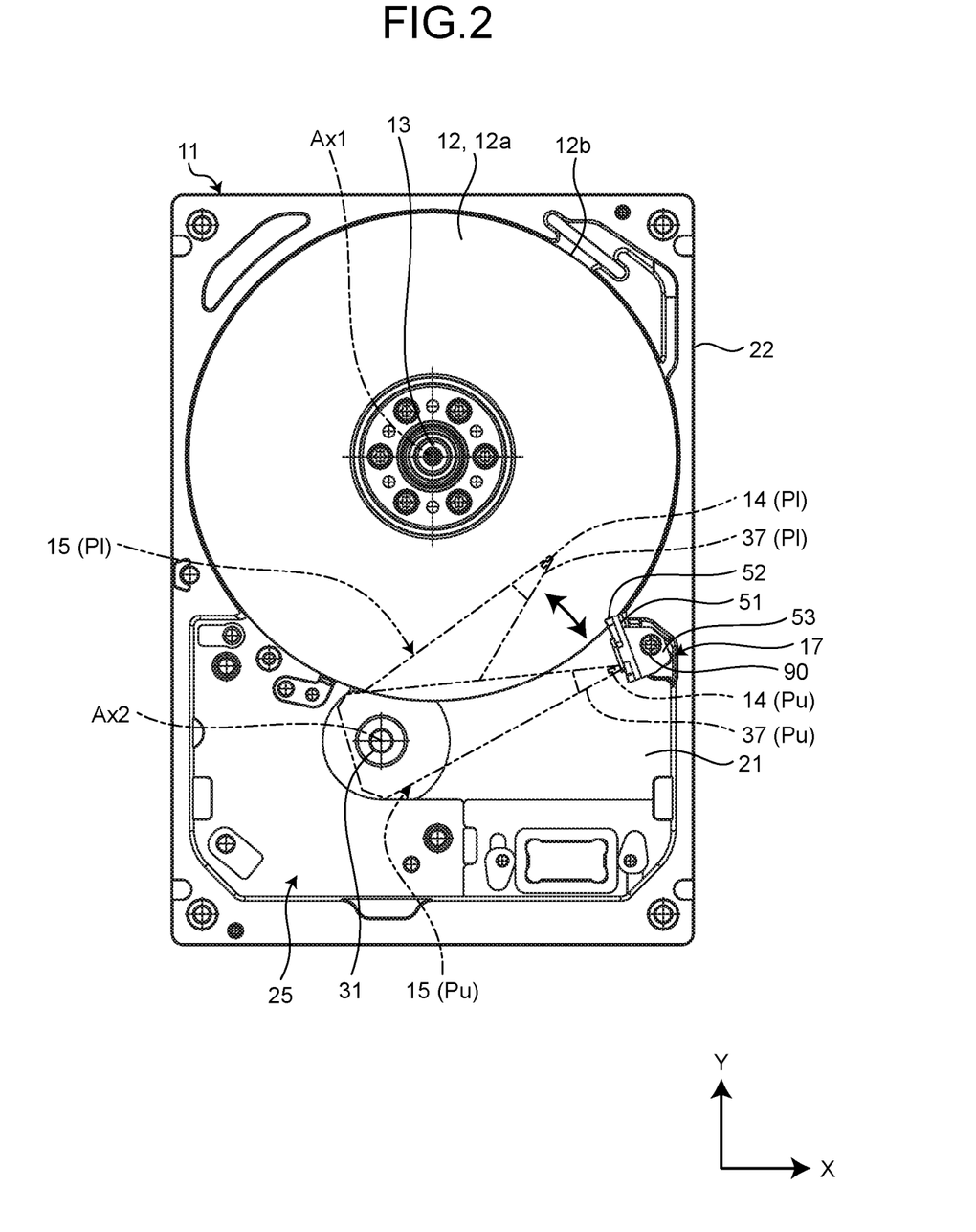
FIG. 2 is an exemplary plan view illustrating a housing, a magnetic disk, and a ramp load mechanism of the first embodiment.

FIG. 2 is an exemplary plan view illustrating the housing 11, the magnetic disk 12, and the ramp load mechanism 17 of the first embodiment. As illustrated in FIG. 2, the ramp load mechanism 17 is disposed at a position separated from the first rotation axis Ax1 in a direction orthogonal to the first rotation axis Ax1. Further, the ramp load mechanism 17 is separated from the second rotation axis Ax2 in a direction orthogonal to the second rotation axis Ax2.

Figure 3:
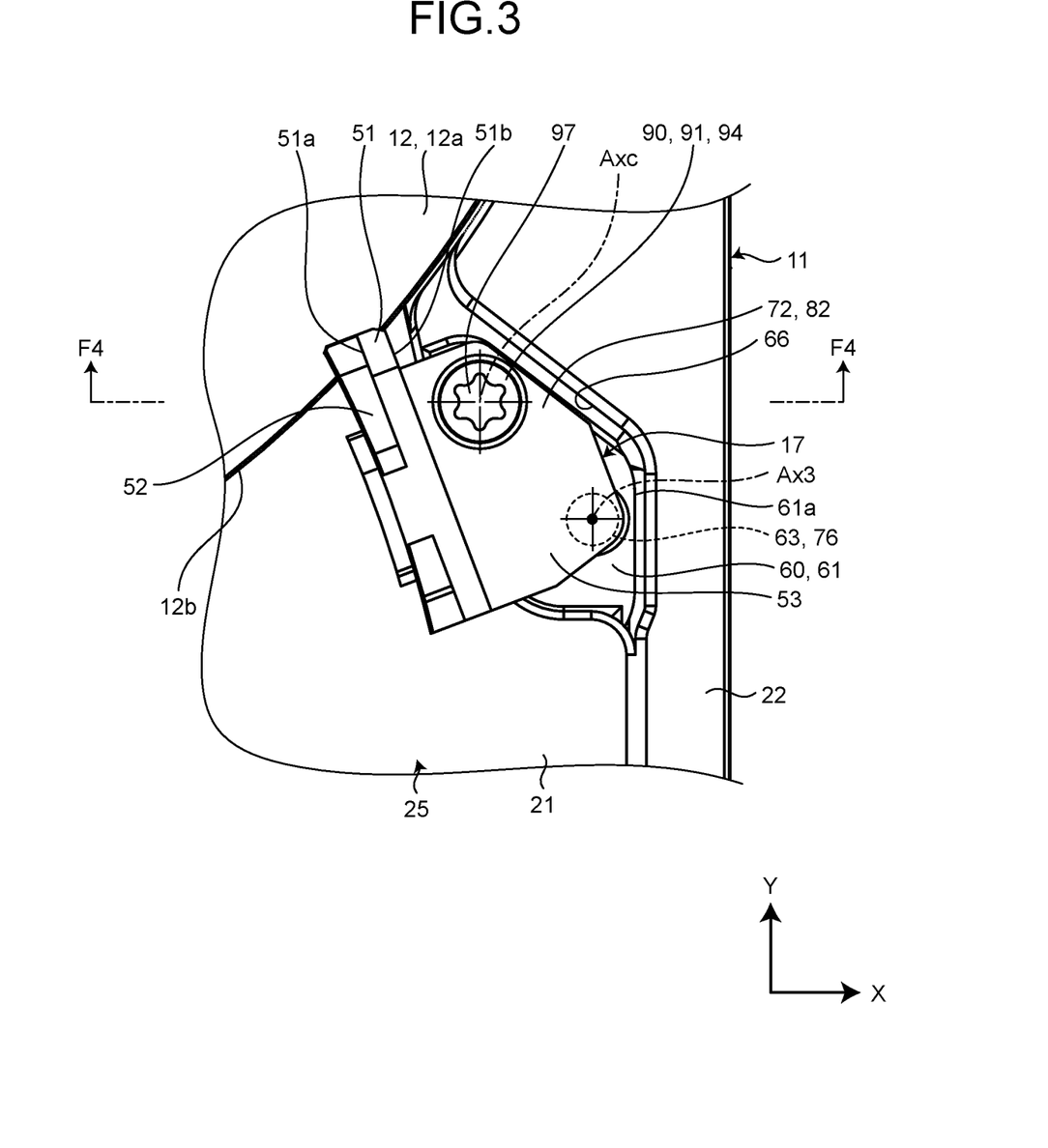
FIG. 3 is an exemplary plan view illustrating a part of the housing and the ramp load mechanism of the first embodiment.
Figure 4:
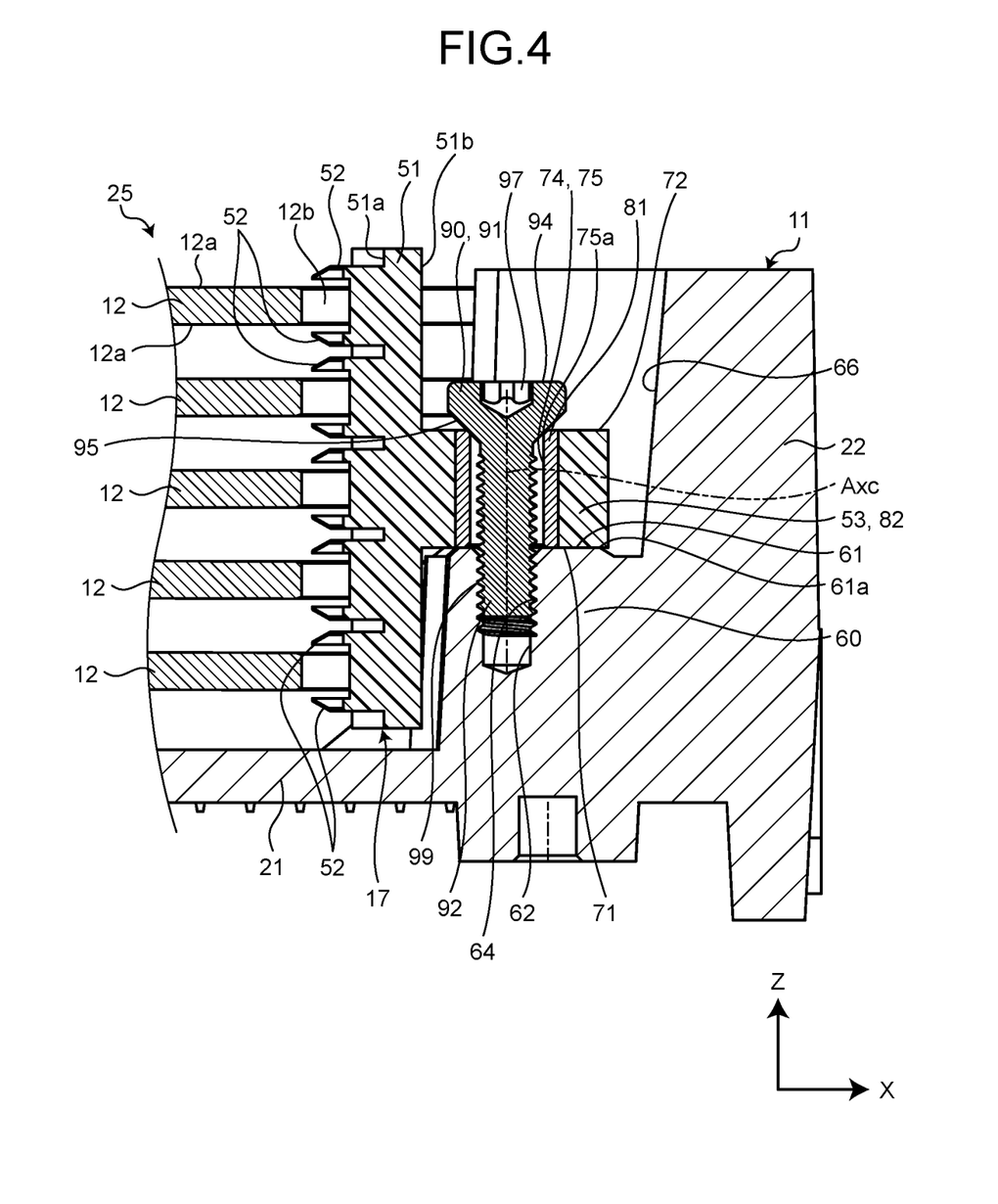
FIG. 4 is an exemplary cross-sectional view illustrating a part of the HDD of the first embodiment taken along line F4-F4 of FIG. 3.

FIG. 3 is an exemplary plan view illustrating a part of the housing 11 and the ramp load mechanism 17 of the first embodiment. FIG. 4 is an exemplary cross-sectional view illustrating a part of the HDD 10 of the first embodiment taken along line F4-F4 of FIG. 3. As illustrated in FIG. 4, the ramp load mechanism 17 includes a base wall 51, a plurality of protrusions 52, and an attachment tab 53.

The base wall 51 has a plate shape extending substantially in the Z direction. The base wall 51 has two flat surfaces 51a and 51b facing in a direction substantially orthogonal to the Z direction. The flat surface 51b is opposite the flat surface 51a.

The plurality of protrusions 52 protrudes from the flat surface 51a of the base wall 51. The protrusions 52 correspond to the magnetic heads 14 that read and write information from and to the recording surfaces 12a of the magnetic disks 12, and the suspensions 37 that hold the magnetic heads 14. The protrusions 52 are arranged at intervals in the Z direction. Each magnetic disk 12 is disposed in a gap between the corresponding protrusions 52.

The protrusion 52 is located near the outer edge 12b of the magnetic disk 12. The protrusion 52 covers a part of the recording surface 12a. The protrusion 52 can hold the tip end of the suspension 37 away from the outer edge 12b in the direction orthogonal to the first rotation axis Ax1. Note that the protrusion 52 may hold the tip end of the suspension 37 inside the outer edge 12b in the direction orthogonal to the first rotation axis Ax1.

The tip end of the suspension 37 is held by the protrusion 52 as described above while the magnetic head 14 is not reading or writing information from or to the magnetic disk 12 (during unloading). During unloading, the magnetic head 14 is disposed away from the outer edge 12b of the magnetic disk 12 in the direction orthogonal to the first rotation axis Ax1. Note that the positions of the magnetic head 14 and the suspension 37 during unloading are not limited to this example.

On the other hand, when the magnetic head 14 reads and writes information from and to the magnetic disk 12 (during loading), the tip end of the suspension 37 is basically located on the recording surface 12a of the magnetic disk 12 together with the magnetic head 14. Note that the positions of the magnetic head 14 and the suspension 37 during loading are not limited to this example.

The tip end of the suspension 37 moves between a region on the recording surface 12a and a position (home position) held by the protrusion 52 along with the rotation of the HSA 15. The magnetic head 14 and the suspension 37 move (rotate) about the second rotation axis Ax2 along with the rotation of the HSA 15.

As illustrated in FIG. 2, the HSA 15 and the suspension 37 included in the HSA 15 rotate (move) about the second rotation axis Ax2 between the load position P1 and the unload position Pu. The load position P1 and the unload position Pu correspond to angles (positions) around the second rotation axis Ax2 along which the HSA 15 extends.

During loading, the HSA 15 is located at the load position P1. That is, at the load position P1 of the HSA the magnetic head 14 is located on the recording surface 12a of the magnetic disk 12. Note that the load position P1 is not limited to one position, and includes a plurality of positions of the magnetic head 14 on the recording surface 12a.

During unloading, the HSA 15 is located at the unload position Pu. That is, at the unload position Pu of the HSA 15, the tip end of the suspension 37 is held by the protrusion 52 of the ramp load mechanism 17 to allow the magnetic head 14 to be away from the recording surface 12a.

As illustrated in FIG. 4, the attachment tab 53 protrudes from the flat surface 51b of the base wall 51. The attachment tab 53 has, for example, a plate shape along the X-Y plane. Note that the shape of the attachment tab 53 is not limited to this example. The attachment tab 53 is attached to the housing 11.

The housing 11 further includes a support plate 60. The support plate 60 protrudes from the bottom wall 21 in the +Z direction and is connected to the peripheral wall 22. The support plate 60 has a support surface 61. The support surface 61 is substantially flat and faces substantially in the +Z direction. The support surface 61 supports the attachment tab 53 of the ramp load mechanism 17.

Figure 5:
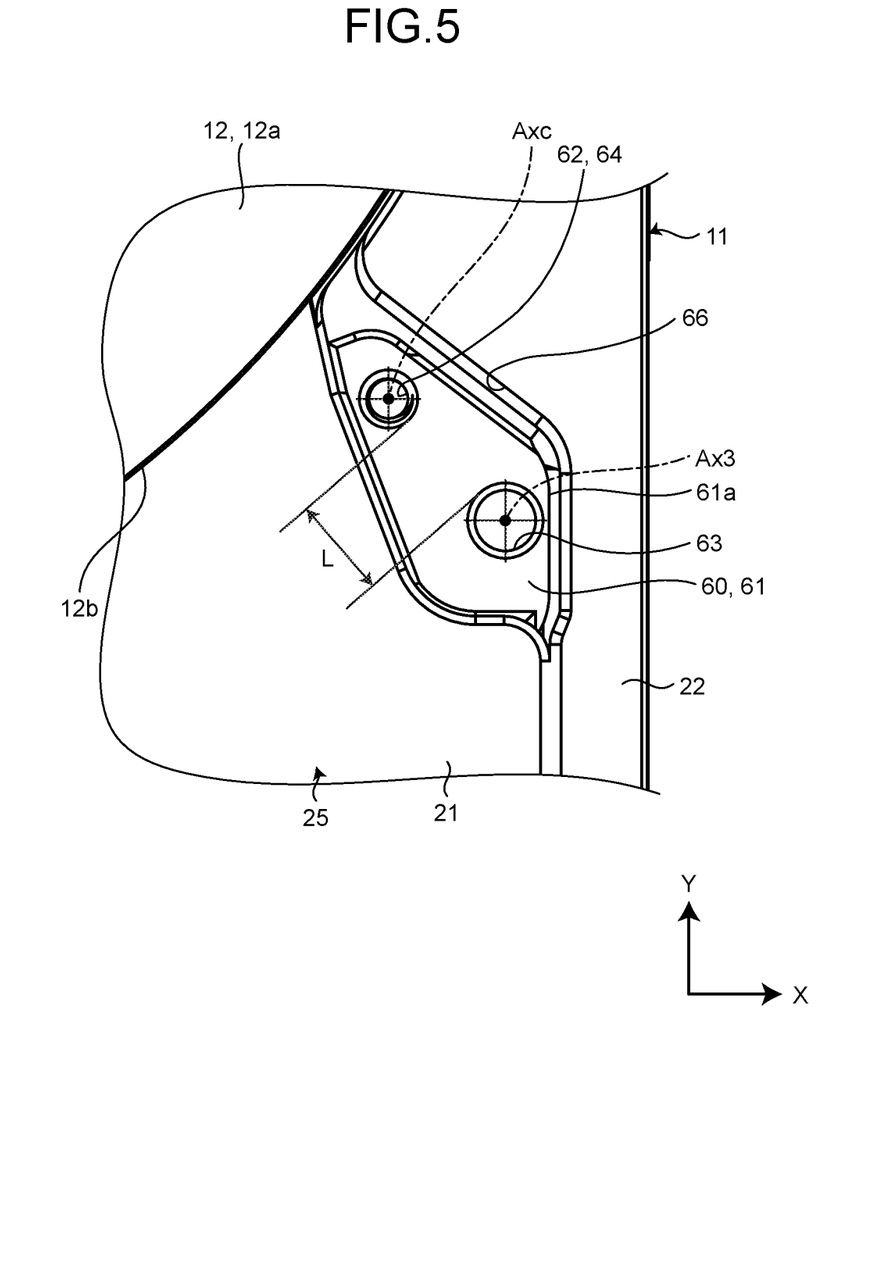
FIG. 5 is an exemplary plan view illustrating a support plate of the first embodiment.

FIG. 5 is an exemplary plan view illustrating the support plate 60 of the first embodiment. As illustrated in FIG. 5, the support surface 61 is provided with a screw hole 62 and a retention hole 63. In other words, the screw hole 62 and the retention hole 63 are located in the support plate 60 and open to the support surface 61. The retention hole 63 is an example of a hole.

The screw hole 62 is closer to the magnetic disk 12 than the retention hole 63. In other words, the distance between the screw hole 62 and the magnetic disk 12 is shorter than the distance between the retention hole 63 and the magnetic disk 12. Further, the screw hole 62 is closer to the base wall 51 and the protrusion 52 of the ramp load mechanism 17 than the retention hole 63. Note that the position of the screw hole 62 is not limited to this example.

The screw hole 62 and the retention hole 63 are holes having a circular cross section, and are recessed substantially in the −Z direction from the support surface 61. That is, the screw hole 62 and the retention hole 63 extend substantially in parallel. The screw hole 62 and the retention hole 63 are bottomed holes and do not penetrate the housing 11. The screw hole 62 has a female thread 64 on the inner peripheral surface.

In a direction orthogonal to the Z direction, a distance L between the screw hole 62 and the retention hole 63 is longer than the major diameter of the female thread 64 on the screw hole 62. Note that the distance L is not limited to this example.

The peripheral wall 22 of the housing 11 has an inner side surface 66. The inner side surface 66 is an example of a side surface. The inner side surface 66 faces or is inclined to a direction substantially orthogonal to the Z direction. As illustrated in FIG. 4, the inner side surface 66 faces the inside of the inner chamber 25, for example, faces the attachment tab 53 of the ramp load mechanism 17.

Since the support plate 60 is connected to the peripheral wall 22, the inner side surface 66 is connected to an edge 61a of the support surface 61. There may be, for example, a groove, a recess, or a protrusion between the inner side surface 66 and the edge 61a of the support surface 61.

As illustrated in FIG. 3, the ramp load mechanism 17 including the attachment tab 53 is spaced apart from the inner side surface 66 of the peripheral wall 22. Further, as illustrated in FIG. 4, the base wall 51 and the protrusion 52 of the ramp load mechanism 17 are separated from the support plate 60. The ramp load mechanism 17 may be in contact with the inner side surface 66.

The attachment tab 53 has a lower surface 71 and an upper surface 72. Note that in this disclosure the terms "upper" and "lower" are defined for convenience with reference to the placement of the HDD 10 in FIG. 4, for example, and are not intended to limit various conditions such as arrangement, orientation, and usage mode of each element in the HDD 10.

The lower surface 71 is substantially flat and faces substantially in the −Z direction. The lower surface 71 is in contact with the support surface 61 and is supported by the support surface 61. Note that other components may be interposed between the support surface 61 and the lower surface 71. The upper surface 72 is opposite the lower surface 71. The upper surface 72 is substantially flat and faces substantially in the +Z direction.

The attachment tab 53 is provided with a through hole 74. The through hole 74 penetrates the attachment tab 53 substantially in the Z direction and is open to the lower surface 71 and the upper surface 72. The through hole 74 communicates with the screw hole 62 in the support surface 61. The through hole 74 has a circular cross section. The diameter of the through hole 74 is longer than the major diameter of the female thread 64 on the screw hole 62. Note that the shape of the cross section of the through hole 74 is not limited to this example.

The attachment tab 53 further includes an inner surface 75 of the through hole 74. The inner surface 75 is a substantially cylindrical curved surface that forms (defines, partitions) the through hole 74. According to another expression, the inner surface 75 faces the inside of the through hole 74.

As illustrated in FIG. 3, the ramp load mechanism 17 further includes a pin 76. The pin 76 protrudes substantially in the −Z direction from the lower surface 71 of the attachment tab 53. The −Z direction is an example of a first direction. The pin 76 and the through hole 74 are apart from each other in a direction orthogonal to the Z direction.

The pin 76 has a substantially columnar shape. The diameter of the pin 76 is slightly shorter than the diameter of the retention hole 63. Note that the shape of the pin 76 is not limited to this example. The pin 76 is fitted into the retention hole 63. As a result, the ramp load mechanism 17 is rotatable about a third rotation axis Ax3. The third rotation axis Ax3 is a virtual axis extending substantially in the Z direction, and is, for example, the axis of the retention hole 63 and the pin 76. The ramp load mechanism 17 is thus rotatable around the pin 76.

As illustrated in FIG. 4, in the present embodiment, the attachment tab 53 includes a first part 81 and a second part 82. The first part 81 may also be referred to as a sleeve. The first part 81 is made of metal, for example. The second part 82 is made of, for example, synthetic resin and is softer than the first part 81. For example, the second part 82 is lower in rigidity, hardness, and Young's modulus than the first part 81. Note that the attachment tab 53 may be made of a single material.

The first part 81 has a substantially cylindrical shape extending substantially in the Z direction. The substantially cylindrical first part 81 is internally provided with the through hole 74. Thus, the first part 81 has the inner surface 75.

The second part 82 is integrated with the first part 81, for example, by insert molding. The second part 82 includes the pin 76. Further, the second part 82 is integral with the base wall 51 and the plurality of protrusions 52. Similarly to the second part 82, the base wall 51 and the protrusion 52 are made of, for example, a synthetic resin. Note that the base wall 51 and the protrusion 52 are not limited to this example.

In the lower surface 71 and the upper surface 72, the first part 81 is exposed. Thus, the first part 81 has one part of the lower surface 71 and the second part 82 has the other part of the lower surface 71. Further, the first part 81 has one part of the upper surface 72 and the second part 82 has the other part of the upper surface 72.

The HDD 10 further includes a screw 90. The attachment tab 53 of the ramp load mechanism 17 is fixed to the support plate 60 of the housing 11 with the screw 90. The screw 90 includes a screw head 91 and a screw shaft 92.

The screw head 91 has a substantially columnar shape extending substantially in the Z direction. The screw head 91 has an upper surface 94 and a lower surface 95. In other words, the upper surface 94 and the lower surface 95 are part of the screw head 91. The lower surface 95 is an example of a first contact surface.

The upper surface 94 is substantially flat and faces substantially in the +Z direction. The upper surface 94 is provided with a hole 97 into which a protrusion of a screwdriver is to be inserted. The lower surface 95 is opposite the upper surface 94. The lower surface 95 has a substantially conical shape tapering substantially in the −Z direction. In other words, the diameter of the lower surface 95 decreases substantially in the −Z direction.

In the example of FIG. 4, the outline of the lower surface 95 extends linearly. However, the lower surface 95 is not limited to this example. For example, the lower surface 95 may have an arc-shaped outline.

The screw shaft 92 extends substantially in the −Z direction from about the center of the lower surface 95 of the screw head 91. In other words, the screw head 91 is located at the end of the screw shaft 92 in the +Z direction. The screw shaft 92 has a substantially columnar shape. The axis of the screw head 91 and the axis Axc of the screw shaft 92 substantially coincide with each other. The screw shaft 92 has a male thread 99 formed on the outer peripheral surface. The major diameter of the male thread 99 on the screw shaft 92 is shorter than the diameter of the through hole 74.

The major diameter of the male thread 99 on the screw shaft 92 is slightly shorter than the major diameter of the female thread 64 on the screw hole 62. The minor diameter of the male thread 99 on the screw shaft 92 is slightly shorter than the minor diameter of the female thread 64 on the screw hole 62.

The screw shaft 92 is fitted into the screw hole 62 of the support plate 60 through the through hole 74 of the attachment tab 53. As a result, the male thread 99 of the screw shaft 92 and the female thread 64 of the screw hole 62 are engaged with each other.

The lower surface 95 contacts an edge 75a of the inner surface 75 in the +Z direction. In other words, the lower surface 95 contacts the attachment tab 53. The +Z direction is an example of a second direction. Since the inner surface 75 is included in the first part 81, the lower surface 95 contacts the first part 81.

By the contact between the lower surface 95 of the screw head 91 and the edge 75a of the inner surface 75 of the attachment tab 53, the screw 90 holds the attachment tab 53 in-between the support surface 61 and the lower surface 95. Thus, the attachment tab 53 is attached to the support plate 60 with the screw 90.

The edge 75a has a substantially circular linear shape. About the entire periphery of the substantially conical lower surface 95 around the axis Axc of the screw shaft 92 is in contact with the edge 75a. Thereby, the lower surface 95 presses the attachment tab 53 (edge 75a) in a direction orthogonal to the Z direction to allow the axis of the screw head 91, the axis Axc of the screw shaft 92, and the axis of the through hole 74 to substantially coincide with one another. Note that a part of the edge 75a may be separated from the lower surface 95.

The screw hole 62, the through hole 74, and the screw 90 are located near the edge 61a of the support surface 61. In the present embodiment, in the direction orthogonal to the Z direction, the shortest distance between the edge 61a of the support surface 61 and the major diameter of the female thread 64 on the screw hole 62 is equal to or less than the distance between the major diameter of the male thread 99 on the screw shaft 92 and the diameter of the screw head 91. Note that the screw hole 62, the through hole 74, and the screw 90 are not limited to this example.

The attachment tab 53 is fastened to the support plate 60 with the screw 90, therefore, the support surface 61 and the screw head 91 apply a Z-directional load (axial force) to the attachment tab 53. Thus, the screw 90 restricts the movement of the attachment tab 53 in the Z direction by holding the attachment tab 53 in-between the support surface 61 and the lower surface 95.

While the lower surface 95 tapering in the −Z direction is in contact with the edge 75a, the screw head 91 applies a load to the attachment tab 53 in the −Z direction. Thus, the load applied to the edge 75a from the lower surface 95 can be decomposed into components in the −Z direction and components in a direction orthogonal to the −Z direction. That is, the lower surface 95 presses the edge 75a in the direction orthogonal to the Z direction, and the screw 90 restricts the movement of the attachment tab 53 in the direction orthogonal to the Z direction.

The pin 76 is fitted into the retention hole 63 at a position separated from the screw 90 in the direction orthogonal to the Z direction. Therefore, the screw 90 restricts the rotation of the attachment tab 53 about the third rotation axis Ax3 which is the axis of the pin 76. Furthermore, the pin 76 restricts the rotation of the attachment tab 53 about the axis Axc of the screw shaft 92.

There may be a slight gap between the inner surface of the retention hole 63 and the outer peripheral surface of the pin 76. In this case, the attachment tab 53 can slightly rotate about the axis Axc. However, in the present embodiment, the screw 90 is located near the edge 61a of the support surface 61 and is far away from the pin 76. Therefore, the range in which the attachment tab 53 can rotate is reduced.

As described above, the movement of the ramp load mechanism 17 is restricted in any one of the Z direction, the direction orthogonal to the Z direction, the direction of rotation around the third rotation axis Ax3, and the direction of rotation around the axis Axc. Accordingly, the ramp load mechanism 17 is more reliably positioned.

For example, when an impact acts on the HDD 10 from the outside, the magnetic disk 12 may collide with the ramp load mechanism 17. However, since the ramp load mechanism 17 is reliably positioned, the ramp load mechanism is held at a predetermined position. Since the position of the ramp load mechanism 17 is maintained, the unload positions Pu of the magnetic head 14 and the suspension 37 are also maintained.

When the ramp load mechanism 17 described above is attached to the housing 11, first, the pin 76 is inserted into the retention hole 63. At this time, the screw hole 62 and the through hole 74 may be separated from each other around the third rotation axis Ax3.

Next, the ramp load mechanism 17 is rotated about the third rotation axis Ax3 so that the screw hole 62 and the through hole 74 communicate with each other. Further, the screw shaft 92 of the screw 90 is inserted into the through hole 74 and fitted into the screw hole 62. The screw 90 is tightened until the lower surface 95 comes into contact with the edge 75a. As described above, the ramp load mechanism 17 is attached to the housing 11. Note that the method of attaching the ramp load mechanism 17 to the housing 11 is not limited to this example.

In the HDD 10 according to the first embodiment described above, the ramp load mechanism 17 includes the attachment tab 53 with the through hole 74. The housing 11 has the support surface 61 with the screw hole 62 to support the attachment tab 53. The screw 90 includes the screw head 91, the screw shaft 92, and the lower surface 95. The screw shaft 92 extends in the −Z direction from the screw head 91 and is fitted into the screw hole 62 through the through hole 74. The lower surface 95 is included in the screw head 91, tapered in the −Z direction, and in contact with the attachment tab 53. The screw 90 holds the attachment tab 53 in-between the support surface 61 and the lower surface 95. By the contact between the lower surface 95 tapering in the −Z direction and the attachment tab 53, the screw 90 can restrict the movement of the attachment tab 53 not only in the −Z direction and the +Z direction but also in the direction orthogonal to the −Z direction. In this manner, the screw 90 can work to more correctly position the ramp load mechanism 17. In addition, the screw 90 can prevent the ramp load mechanism 17 from being displaced from a predetermined position, for example, in a situation that the ramp load mechanism 17 is hit by any of the magnetic disks 12.

Traditionally, the ramp load mechanism 17 may be positioned by, for example, bringing the attachment tab 53 into contact with the inner side surface 66 of the housing 11. However, in the HDD 10 of the present embodiment, the screw 90 can restrict the movement of the attachment tab 53 in the direction orthogonal to the −Z direction. This eliminates the necessity for the attachment tab 53 to contact the inner side surface 66, so that the inner side surface 66 can be spaced from the attachment tab 53. This allows the screw 90 to be disposed at the end of the attachment tab 53. Even in this case, the screw 90 or the fastening tool for the screw 90 can be prevented from interfering with the inner side surface 66. Due to such features, the HDD 10 according to the present embodiment enables improvement in flexibility of placement of the screw 90.

The lower surface 95 is included in the screw head 91. That is, the screw head 91 directly contacts the attachment tab 53. This can eliminate the necessity for adding a component as a washer between the screw head 91 and the attachment tab 53, reducing the number of components.

The attachment tab 53 further includes the inner surface 75 of the through hole 74. The lower surface 95 contacts the edge 75a of the inner surface 75 in the +Z direction. As a result, the attachment tab 53 can be of a simpler form, resulting in cost reduction.

The support surface 61 is provided with the retention hole 63. The ramp load mechanism 17 includes the pin 76 that protrudes from the attachment tab 53 in the −Z direction and is fitted into the retention hole 63. The ramp load mechanism 17 is rotatable around the pin 76. In the direction orthogonal to the −Z direction, the through hole 74 is apart from the pin 76. As a result, the screw can restrict the ramp load mechanism 17 from rotating about the pin 76 and from moving together with the pin 76 in the direction orthogonal to the −Z direction. As such, the screw 90 and the pin 76 can work to more correctly position the ramp load mechanism 17 and prevent the ramp load mechanism 17 from being displaced from a predetermined position.

In the direction orthogonal to the −Z direction, the distance L between the retention hole 63 and the screw hole 62 is longer than the major diameter of the screw hole 62. That is, the screw 90 holds the attachment tab 53 far away from the retention hole 63 and the pin 76 being the center of rotation of the ramp load mechanism 17. This allows, for example, the HDD 10 to decrease the rotatable range of the ramp load mechanism 17 about the screw 90 even when a gap occurs between the inner surface of the retention hole 63 and the outer peripheral surface of the pin 76.

The housing 11 has the inner side surface 66 connected to the edge 61a of the support surface 61 and facing the attachment tab 53. The attachment tab 53 is spaced apart from the inner side surface 66. Due to such arrangement, the screw 90 may be disposed at the end of the attachment tab 53, for example. Even in this case, the inner side surface 66 can be prevented from interfering with the screw 90 or the fastening tool for the screw 90. This allows, for example, setting of a longer distance between the screw 90 and other parts or components that position the ramp load mechanism 17 such as the pin 76.

In the direction orthogonal to the −Z direction, the shortest distance between the edge 61a of the support surface 61 and the major diameter of the female thread 64 on the screw hole 62 is equal to or less than the distance between the major diameter of the male thread 99 on the screw shaft 92 and the diameter of the screw head 91. That is, the screw hole 62, the through hole 74, and the screw 90 are located near the edge 61a of the support surface 61. Such arrangement allows, for example, setting of a longer distance between the screw 90 and other parts or components that position the ramp load mechanism 17 such as the pin 76. Furthermore, the inner side surface 66 is apart from the attachment tab 53 and can thus be prevented from interfering with the screw 90 or the fastening tool for the screw 90.

The attachment tab 53 includes the first part 81 with the through hole 74 and the second part 82 softer than the first part 81. The first part 81 contacts the lower surface 95. Thus, the attachment tab 53 can be prevented from being deformed by the axial force from the screw 90.

Second Embodiment

Hereinafter, a second embodiment will be described with reference to FIG. 6. In the following description of the plurality of embodiments, components having functions similar to those of the components already described are denoted by the same reference numerals as those of the components already described, and the description thereof may be omitted. In addition, the plurality of components denoted by the same reference numerals do not necessarily have all the functions and properties in common, and may have different functions and properties according to each embodiment.

Figure 6:
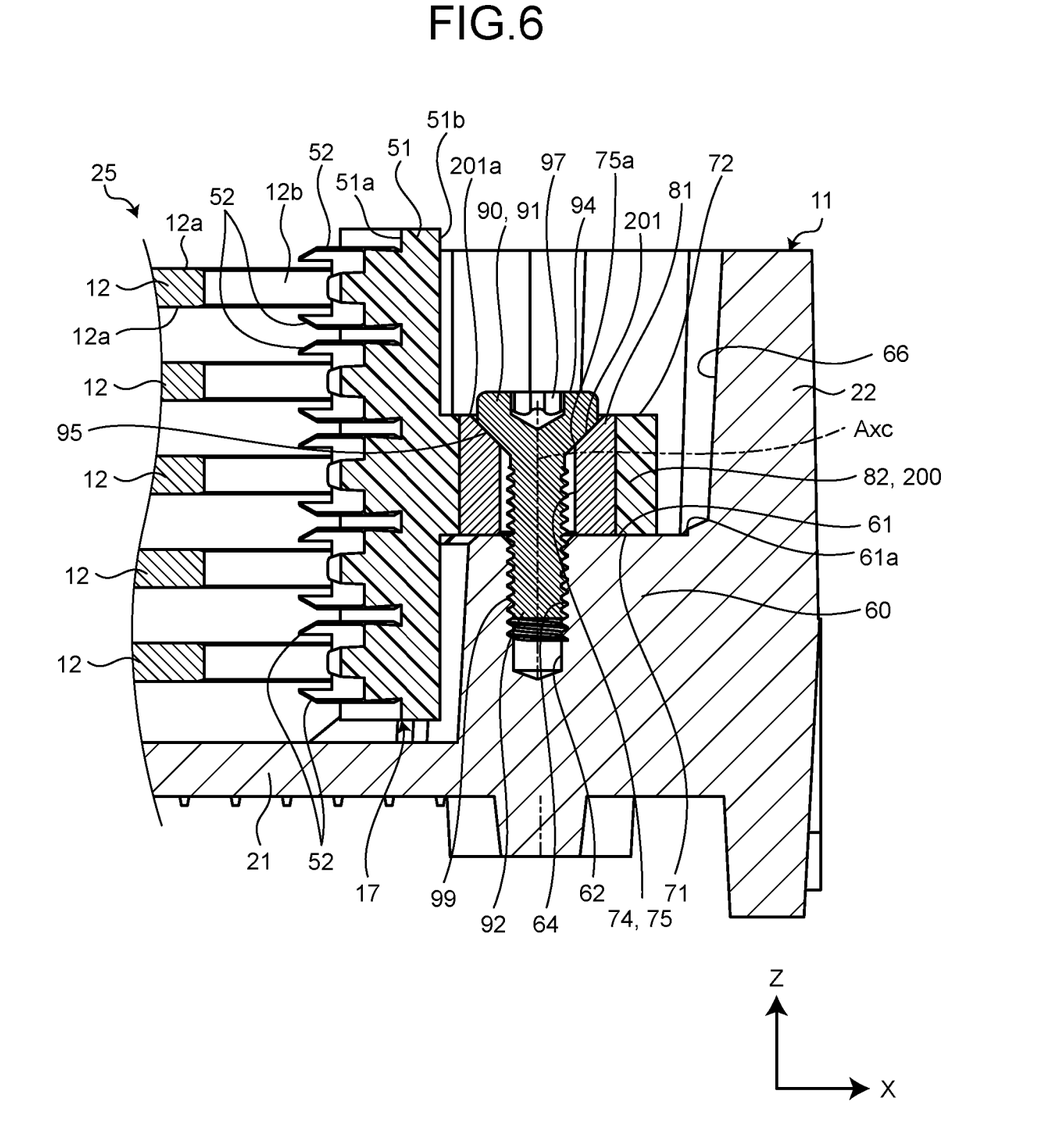
FIG. 6 is an exemplary cross-sectional view illustrating a part of an HDD according to a second embodiment.

FIG. 6 is an exemplary cross-sectional view illustrating a part of an HDD 10 according to a second embodiment. As illustrated in FIG. 6, a ramp load mechanism 17 of the second embodiment includes an attachment tab 200 instead of the attachment tab 53. The attachment tab 200 is substantially the same as the attachment tab 53 of the first embodiment except for the points described below.

The attachment tab 200 has an inclined surface 201. The inclined surface 201 is an example of a second contact surface. The inclined surface 201 is located between the upper surface 72 and the edge 75a of the inner surface 75. In other words, the inclined surface 201 is at the inlet of the through hole 74 and connected to the edge of the inner surface 75.

The inclined surface 201 has a substantially conical shape tapered substantially in the −Z direction. In other words, the inclined surface 201 tapers toward the inner surface 75. The angle between the axis of the through hole 74 and the inclined surface 201 is substantially equal to the angle between the axis Axc of the screw shaft 92 and the lower surface 95. Note that the angle of the inclined surface 201 is not limited to this example.

The diameter of an edge 201a of the inclined surface 201 in the +Z direction is longer than the diameter of a screw head 91. The first part 81 has the inclined surface 201. Thus, the diameter of the outer peripheral surface of the substantially cylindrical first part 81 is equal to or larger than the diameter of the edge 201a.

In the second embodiment, the lower surface 95 of the screw head 91 contacts the inclined surface 201. About the entire periphery of the substantially conical lower surface 95 around the axis Axc of the screw shaft 92 is in contact with the substantially conical inclined surface 201. Because of this, the lower surface 95 presses the attachment tab 200 (inclined surface 201) in a direction orthogonal to the Z direction to allow the axis of the screw head 91, the axis Axc of the screw shaft 92, and the axis of the through hole 74 to substantially coincide with one another. Note that a part of the inclined surface 201 may be separated from the lower surface 95. Further, the lower surface 95 may contact the edge 75a of the inner surface 75.

In the HDD 10 of the second embodiment described above, the attachment tab 200 has the inner surface 75 of the through hole 74 and the inclined surface 201. The inclined surface 201 is connected to the edge 75a of the inner surface 75 in the +Z direction, and tapers toward the inner surface 75. The lower surface 95 contacts the inclined surface 201. Thus, the screw 90 can more effectively restrict the movement of the attachment tab 53 in the direction orthogonal to the −Z direction. As such, the screw 90 can work to more correctly position the ramp load mechanism 17, and prevent the ramp load mechanism 17 from being displaced from a predetermined position. Further, the lower surface 95 is in surface contact with the inclined 201 surface rather than in point or edge contact. Thereby, the lower surface 95 can be prevented from being deformed or deforming the attachment tab 200.

The edge 201a of the inclined surface 201 in the +Z direction is longer in diameter than the screw head 91. For example, in the attachment tab 200 the first part 81 having the inner surface 75 of the through hole 74 and the inclined surface 201 may be different in hardness from the second part 82. In such a case, due to the edge 201a of a longer diameter, the first part 81 having the inner surface of the through hole 74 and the inclined surface 201 solely comes into contact with the lower surface 95. It is thus possible to simplify the strength design of the ramp load mechanism 17 and facilitate the design of the ramp load mechanism 17.

Third Embodiment

Figure 7:
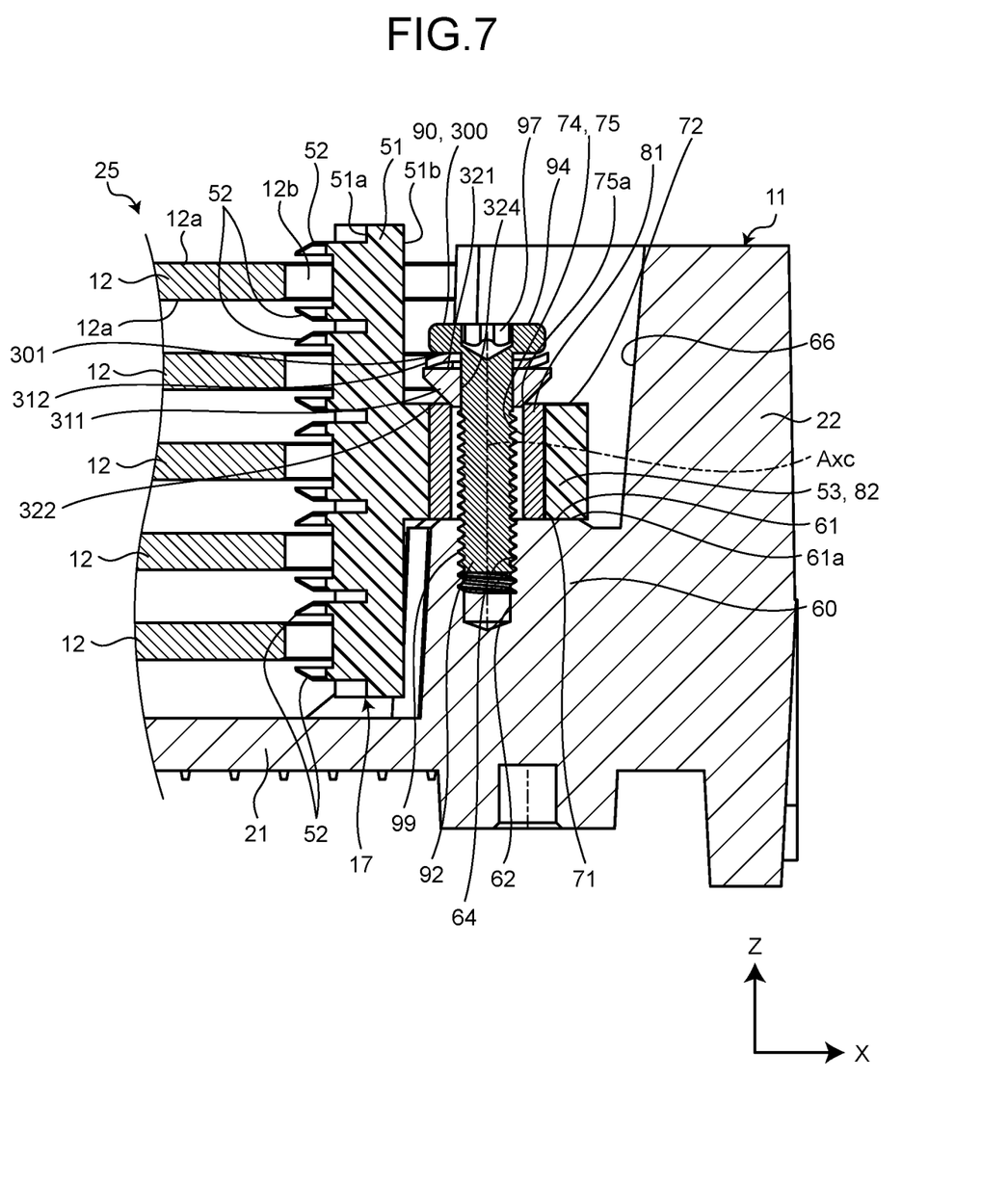
FIG. 7 is an exemplary cross-sectional view illustrating a part of an HDD according to a third embodiment.

Hereinafter, a third embodiment will be described with reference to FIGS. 7 and 8. FIG. 7 is an exemplary cross-sectional view illustrating a part of an HDD 10 according to the third embodiment. As illustrated in FIG. 7, the screw 90 of the third embodiment has a screw head 300 instead of the screw head 91. The screw head 300 is substantially equal to the screw head 91 of the first embodiment except for the points described below.

The screw head 300 has a lower surface 301 instead of the lower surface 95. The lower surface 301 is substantially flat and faces substantially in the −Z direction. The screw shaft 92 extends substantially in the −Z direction from the lower surface 301. The lower surface 301 faces the upper surface 72 of the attachment tab 53.

The screw 90 of the third embodiment further includes a first washer 311 and a second washer 312. The first washer 311 is an example of a washer. The second washer 312 may be omitted.

The first washer 311 has a substantially disk shape substantially orthogonal to the Z direction. The first washer 311 has an upper surface 321 and a lower surface 322. In other words, the upper surface 321 and the lower surface 322 are part of the first washer 311. The lower surface 322 is an example of a first contact surface. The upper surface 321 is substantially flat and faces substantially in the +Z direction. The upper surface 321 faces the lower surface 301 of the screw head 300. The lower surface 322 is opposite the upper surface 321.

The first washer 311 is provided with an insertion hole 324. The insertion hole 324 is located at about the center of the first washer 311 in the direction orthogonal to the Z direction, and penetrates the first washer 311 substantially in the Z direction. Thus, the insertion hole 324 opens to the upper surface 321 and the lower surface 322.

The screw shaft 92 extends through the insertion hole 324. Thus, the first washer 311 is located between the lower surface 301 of the screw head 300 and the attachment tab 53. Further, the lower surface 322 is located between the screw head 300 and the attachment tab 53. The screw shaft 92 is fitted into the screw hole 62 through the insertion hole 324 and the through hole 74. The diameter of the insertion hole 324 is slightly longer than the major diameter of the male thread 99 on the screw shaft 92. Furthermore, the diameter of the insertion hole 324 is shorter than the diameter of the through hole 74.

The lower surface 322 of the first washer 311 has a substantially conical shape tapering substantially in the −Z direction. The lower surface 322 contacts the edge 75a of the inner surface 75 of the through hole 74. In other words, the lower surface 322 contacts the attachment tab 53.

The upper surface 321 may have a substantially conical shape tapering in the +Z direction symmetrically with respect to the lower surface 322. In this case, since the shape of the upper surface 321 and the shape of the lower surface 322 are substantially the same, it is not necessary to check the direction of the first washer 311 when the first washer 311 is attached to the screw shaft 92. Therefore, the screw 90 can be easily manufactured.

Figure 8:
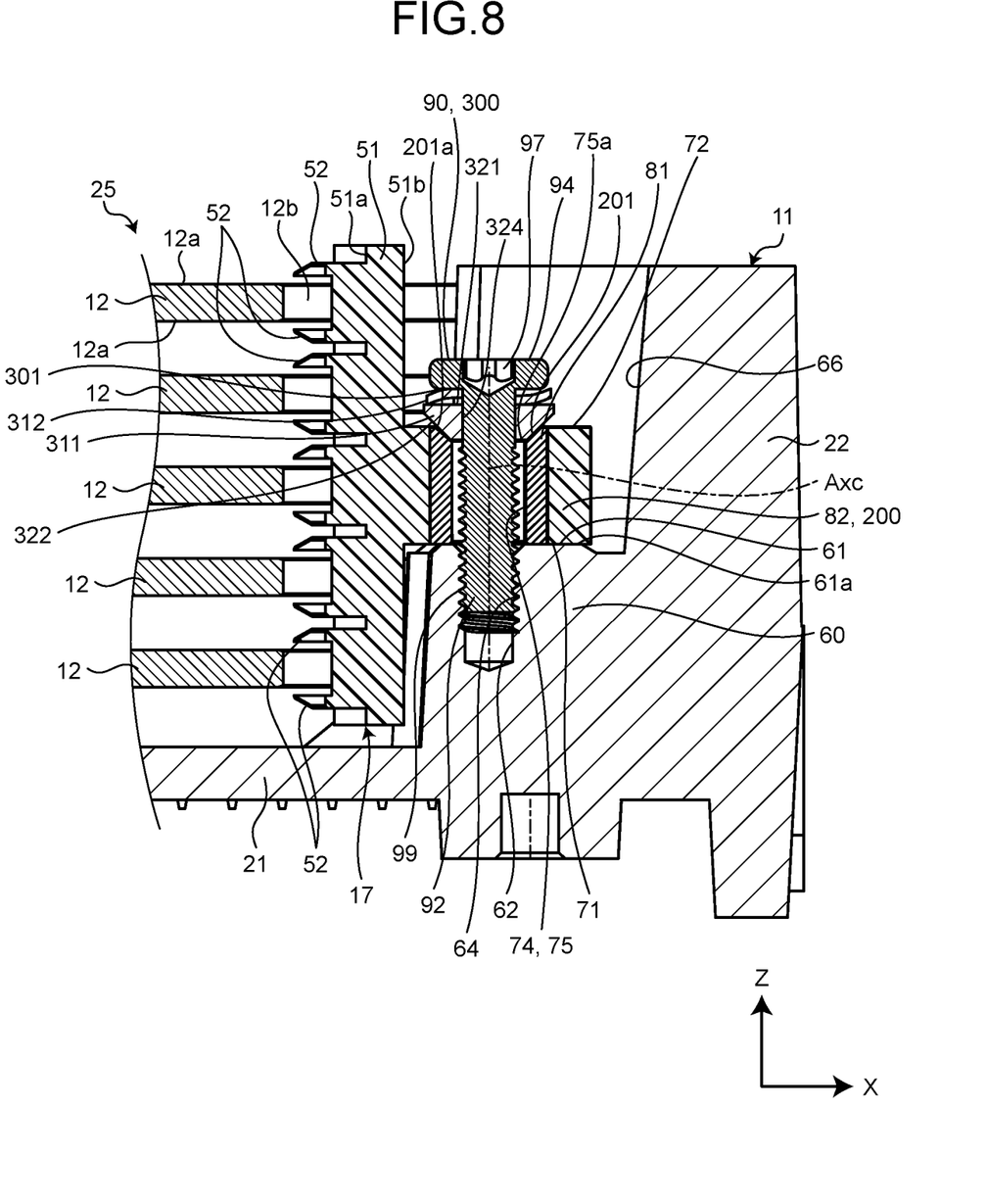
FIG. 8 is an exemplary cross-sectional view illustrating a part of an HDD according to a modification of the third embodiment.

FIG. 8 is an exemplary cross-sectional view illustrating a part of the HDD 10 according to a modification of the third embodiment. As illustrated in FIG. 8, when the attachment tab 200 has the inclined surface 201, the lower surface 322 comes into contact with the inclined surface 201.

As described above, the lower surface 322 may be in contact with the edge 75a of the inner surface 75 similarly to the lower surface 95 of the first embodiment, or may be in contact with the inclined surface 201 similarly to the lower surface 95 of the second embodiment. Note that the lower surface 322 may be in contact with another part of the attachment tab 53 or 200.

The second washer 312 is provided between the lower surface 301 of the screw head 300 and the first washer 311. The second washer 312 is, for example, a spring washer, and prevents loosening of the screw 90.

In the HDD 10 of the third embodiment described above, the lower surface 322 is included in the first washer 311 located between the screw head 300 and the attachment tab 53 or 200. As a result, the screw head 300 can be a typical flat type, leading to cost reduction relating to the screw 90. Further, the screw 90 can additionally include another second washer 312, such as a spring washer, between the screw head 300 and the first washer 311, and the screw 90 thus becomes less likely to loose.

The screw shaft 92 passes through the insertion hole 324 in first washer 311. The insertion hole 324 is shorter in diameter than the through hole 74. That is, the gap between the screw shaft 92 and the inner surface of the insertion hole 324 is narrower than the gap between the screw shaft 92 and the inner surface 75 of the through hole 74. As such, the screw 90 can restrict the movement of the attachment tab 53 or 200 in the direction orthogonal to the −Z direction.

Fourth Embodiment

Figure 9:
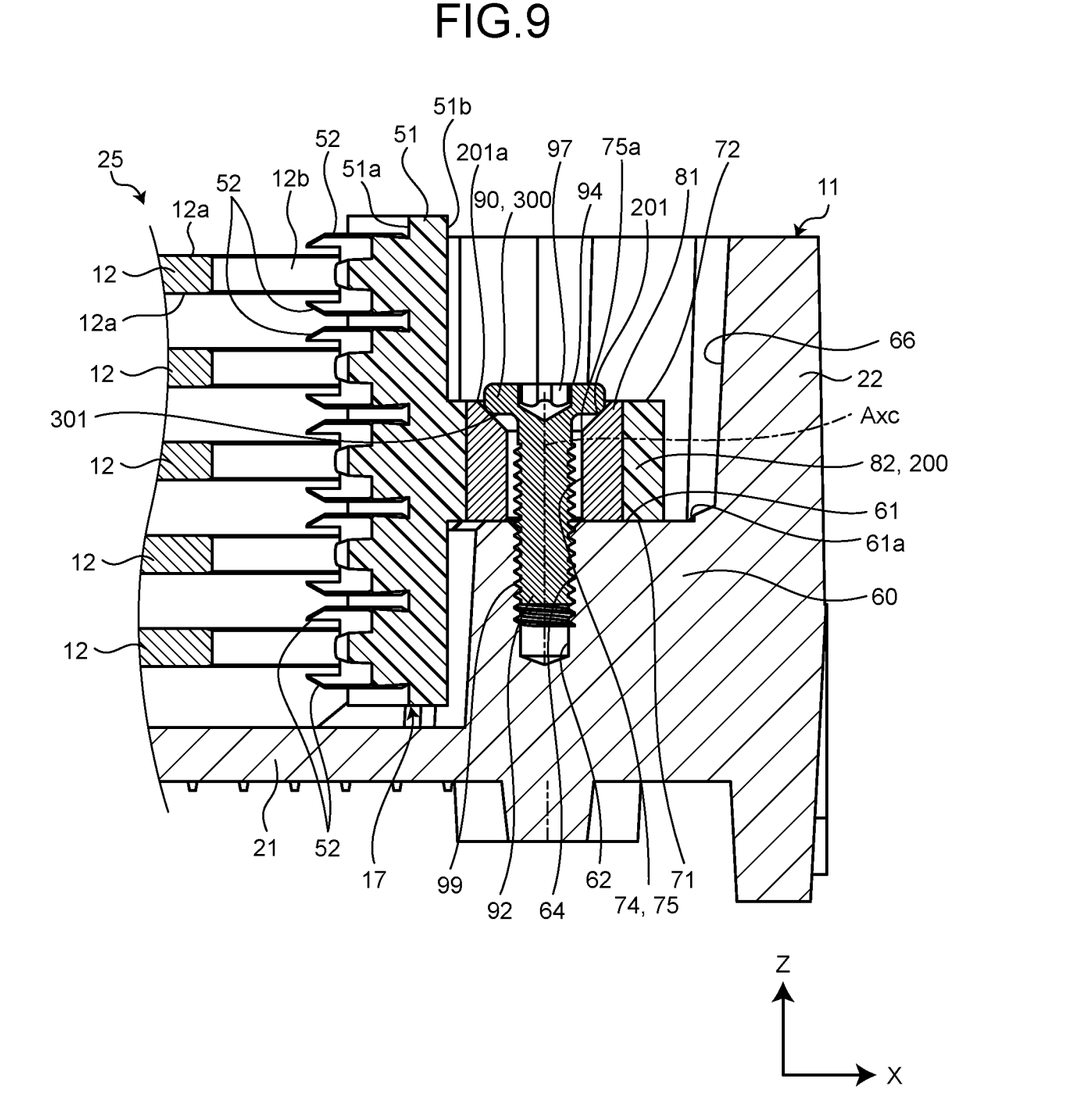
FIG. 9 is an exemplary cross-sectional view illustrating a part of an HDD according to a fourth embodiment.

Hereinafter, a fourth embodiment will be described with reference to FIG. 9. FIG. 9 is an exemplary cross-sectional view illustrating a part of an HDD 10 according to the fourth embodiment. As illustrated in FIG. 9, in the fourth embodiment, the substantially flat lower surface 301 provided on a screw head 300 comes into contact with the inclined surface 201 of an attachment tab 200.

The inclined surface 201 in a substantially conical shape is in contact with the lower surface 301 over substantially the entire periphery around the axis Axc of the screw shaft 92. Therefore, the lower surface 301 pushes the attachment tab 200 (inclined surface 201) in a direction orthogonal to the Z direction such that the axis of the screw head 91, the axis Axc of the screw shaft 92, and the axis of the through hole 74 substantially coincide with each other.

In the HDD 10 of the fourth embodiment described above, the lower surface 301 of the screw head 300 is in contact with the inclined surface 201 tapering toward the inner surface 75. The screw 90 holds the attachment tab 200 in-between the support surface 61 and the lower surface 301. By the contact between the lower surface 301 and the inclined surface 201 tapering toward the inner surface 75, the screw 90 can restrict the movement of the attachment tab 200 not only in the −Z direction and the +Z direction but also in the direction orthogonal to the −Z direction. As a result, the screw 90 can work to more correctly position the ramp load mechanism 17. Further, the screw 90 can prevent the ramp load mechanism 17 from being displaced from a predetermined position, for example, in a situation that the ramp load mechanism 17 is hit by any of the magnetic disks 12.

In the above description, "to prevent (to be prevented)" is defined as, for example, preventing the occurrence of an event, an action, or an influence, or reducing the degree of the event, the action, or the influence. Furthermore, in the above description, "to restrict (to be restricted)" is defined as, for example, preventing movement or rotation, or allowing movement or rotation within a predetermined range and preventing movement or rotation beyond the predetermined range.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
  a magnetic disk having a recording surface;
  a magnetic head configured to read and write information from and to the magnetic disk;
  a suspension holding the magnetic head and configured to move between a load position where the magnetic head is located on the recording surface and an unload position where the magnetic head is apart from the recording surface;
  a ramp including an attachment tab with a through hole, configured to hold the suspension at the unload position;
  a housing that accommodates the magnetic disk, the magnetic head, the suspension, and the ramp, the housing having a support surface with a screw hole to support the attachment tab; and
  a screw including
    a screw head,
    a screw shaft extending from the screw head in a first direction and fitted into the screw hole through the through hole, and
    a first contact surface located on the screw head or in-between the screw head and the attachment tab, tapering in the first direction, and contacting the attachment tab, the screw holding the attachment tab in-between the support surface and the first contact surface, wherein
  the support surface is provided with a hole,
  the ramp includes a pin protruding from the attachment tab in the first direction and fitted into the hole,
  the ramp is rotatable around the pin, and
  the through hole is spaced apart from the pin in a direction orthogonal to the first direction.

2. The disk device according to claim 1, wherein the first contact surface is included in the screw head.

3. The disk device according to claim 1, wherein the screw further includes a washer in-between the screw head and the attachment tab, and the first contact surface is included in the washer.

4. The disk device according to claim 3, wherein the screw shaft passes through an insertion hole formed in the washer, and the insertion hole is smaller in diameter than the through hole.

5. The disk device according to claim 1, wherein the attachment tab has an inner surface of the through hole, and the first contact surface contacts an edge of the inner surface in a second direction opposite to the first direction.

6. The disk device according to claim 1, wherein in the direction orthogonal to the first direction, a distance between the hole and the screw hole is longer than a major diameter of the screw hole.

7. The disk device according to claim 1, wherein the attachment tab includes a first part with the through hole and a second part softer than the first part, and the first contact surface contacts the first part.

8. The disk device according to claim 7, wherein the attachment tab includes a first surface supported by the support surface and a second surface opposite the first surface,
the through hole is open to the first surface and the second surface, and
the first part is exposed in the first surface and the second surface.

9. The disk device according to claim 8, wherein the first part has a cylindrical shape, and a diameter of an outer peripheral surface of the first part is larger than a diameter of the screw head.

10. A disk device comprising:
  a magnetic disk having a recording surface;
  a magnetic head configured to read and write information from and to the magnetic disk:
  a suspension holding the magnetic head and configured to move between a load position where the magnetic head is located on the recording surface and an unload position where the magnetic head is apart from the recording surface;
  a ramp including an attachment tab with a through hole, configured to hold the suspension at the unload position;
  a housing that accommodates the magnetic disk, the magnetic head, the suspension, and the ramp, the housing having a support surface with a screw hole to support the attachment tab; and
  a screw including
    a screw head,
    a screw shaft extending from the screw head in a first direction and fitted into the screw hole through the through hole, and
    a first contact surface located on the screw head or in-between the screw head and the attachment tab, tapering in the first direction, and contacting the attachment tab, the screw holding the attachment tab in-between the support surface and the first contact surface, wherein
  the attachment tab has
    an inner surface of the through hole, and
    a second contact surface connected to an edge of the inner surface in a second direction opposite to the first direction and tapering toward the inner surface, the first contact surface contacts the second contact surface, and
  in the second direction an edge of the second contact surface is longer larger in diameter than the screw head.

11. The disk device according to claim 10, wherein an angle between an axis of the through hole and the second contact surface is equal to an angle between an axis of the screw shaft and the first contact surface.

12. A disk device comprising:
  a magnetic disk having a recording surface;
  a magnetic head configured to read and write information from and to the magnetic disk:

a suspension holding the magnetic head and configured to move between a load position where the magnetic head is located on the recording surface and an unload position where the magnetic head is apart from the recording surface;

a ramp including an attachment tab with a through hole, configured to hold the suspension at the unload position;

a housing that accommodates the magnetic disk, the magnetic head, the suspension, and the ramp, the housing having a support surface with a screw hole to support the attachment tab; and a screw including
- a screw head,
- a screw shaft extending from the screw head in a first direction and fitted into the screw hole through the through hole, and
- a first contact surface located on the screw head or in-between the screw head and the attachment tab, tapering in the first direction, and contacting the attachment tab, the screw holding the attachment tab in-between the support surface and the first contact surface, wherein the housing includes a side surface connected to an edge of the support surface and facing the attachment tab, the attachment tab is spaced apart from the side surface, and in a direction orthogonal to the first direction, a shortest distance between the edge of the support surface and a major diameter of a female thread on the screw hole is equal to or less than a distance between a major diameter of a male thread on the screw shaft and a diameter of the screw head.

* * * * *